United States Patent [19]
Wada et al.

[11] Patent Number: 4,624,531
[45] Date of Patent: Nov. 25, 1986

[54] LIQUID CRYSTAL DEVICE WITH A POSITIVE DISPLAY

[75] Inventors: Masanobu Wada; Tatsuo Uchida, both of Sendai; Toru Teshima, Yokohama, all of Japan

[73] Assignee: Stanley Electric Co., Ltd., Tokyo, Japan

[21] Appl. No.: 158,809

[22] Filed: Jun. 12, 1980

[30] Foreign Application Priority Data

Jun. 22, 1979 [JP] Japan .................. 54-78082

[51] Int. Cl.$^4$ .............................. G02F 1/133
[52] U.S. Cl. .................... 350/340; 350/341; 350/349
[58] Field of Search ............... 350/349, 336, 340, 341

[56] References Cited

U.S. PATENT DOCUMENTS

| | | | |
|---|---|---|---|
| 3,647,280 | 3/1972 | Klein et al. | 350/336 |
| 4,128,313 | 12/1978 | Cole et al. | 350/349 X |
| 4,181,563 | 1/1980 | Miyaka et al. | 350/336 |
| 4,212,011 | 8/1978 | Waldron | 350/336 |
| 4,277,144 | 7/1981 | Saurer et al. | 350/349 |
| 4,297,004 | 10/1981 | Nishimura et al. | 350/334 |

Primary Examiner—John K. Corbin
Assistant Examiner—David Lewis
Attorney, Agent, or Firm—Cushman, Darby & Cushman

[57] ABSTRACT

A display device for effecting a display of a colored image against a colorless background which has a mixture of a liquid crystal having, disposed between a pair of glass substrates, a positive dielectric anisotropy to serve as a host material and a dichroic dye to serve as a guest material, each of which substrates having a transparent electrode of a required pattern adherently formed on its inner surface, characterized in that at least a portion of said pattern of the transparent electrode on each substrate is subjected to a treatment for causing orientation of the molecules of the liquid crystal in a direction parallel to the plane of the substrate when no voltage is applied, and the remaining portions of said pattern and the inner surface of said substrate to be in contact with the liquid crystal are subjected to a treatment for causing orientation of the molecules of the liquid crystal in a direction perpendicular to the plane of the substrate when no voltage is applied.

1 Claim, 10 Drawing Figures

COLORED PORTION

LIQUID CRYSTAL DEVICE WITH A POSITIVE DISPLAY

BACKGROUND OF THE INVENTION (a) Field of the invention:

The present invention relates to a liquid crystal display device of a guest-host type using a mixture of a liquid crystal having a positive dielectric anisotropy and a pleochroic dye, and more particularly, it pertains to such guest-host type liquid crystal display device which is capable of making a positive display, i.e., a display of a colored image against a colorless background.

(b) Description of the prior art:

There has been proposed heretofore a large variety of liquid cyrstal display devices of the so-called guest-host type which use a mixture of a liquid crystal material having a positive dielectric anisotropy serving as a host material and a pleochroic dye serving as a guest material, arranged in a display cell for the purpose of effecting a colored display. Most of these prior art display devices however, are of a negative type that a colorless image appears against a colored background. This is accomplished by the use of the aforementioned type of liquid crystal which has a large dielectric constant in the direction of the longitudinal axes of the liquid crystal molecules. In case such liquid crystal is used to construct a liquid crystal display device, it should be understood that, if the longitudinal axes of the molecules of the liquid crystal are not arranged to be oriented in a direction parallel to the planes of the two parallel glass substrates when no voltage is applied across the electrodes, the display device will be unable to effect a display of an image in response to a voltage applied across the electrodes which are designed to have a configuration corresponding to that of the pattern of the image to be displayed. In such device as mentioned above, an application of a voltage across the electrodes will cause the molecules disposed therebetween to assume an orientation perpendicular to the plane of the substrate. On the other hand, the longitudinal axes of the molecules of the dichroic dye also are oriented in the same direction as those of the molecules of the liquid crystal, irrespective of whether or not there is being applied a voltage across the electrodes. Thus, under no voltage applied, the entire front side of the display device will be visualized as presenting an allover colored display in the color of the dichroic dye as a result of its absorption of light. On the other hand, when a voltage is applied, a colorless image will appear due to the disappearance of the light-absorption effect exerted by the dichroic dye against a colored background provided on those portions other than those where the electrodes are provided.

Alternatively, the positive display, i.e., display of a colored image on a colorless background, may be realized by using a liquid crystal having a negative dielectric anisotropy and by arranging the molecules of the liquid crystal disposed between electrodes in a direction perpendicular to the parallel planes of the substrates when no voltage is applied, so that an application of a voltage will cause re-arrangement of the molecules to assume an orientation in a direction parallel to the planes of the substrates. However, there are some problems in the characteristic of the cell in terms of the level of the voltage required for driving the molecules in the cell, reorientation speed in response to the driving voltage applied and the serving life of the device. For these reasons, this positive display cell has not yet been placed into practical use.

SUMMARY OF THE INVENTION

It is, therefore, a primary object of the present invention to provide a liquid crystal display device which can make a positive display by using a liquid crystal having a positive dielectric anisotropy to serve as a host material and a dichroic dye to serve as a guest material.

DETAILED DESCRIPTION OF THE PREFERRED EMBODIMENTS

The above-stated object of the present invention is accomplished by providing a display device having a mixture of a liquid crystal having a positive dielectric anisotropy to serve as a host material and a dichroic dye to serve as a guest material disposed between a pair of glass substrates, each of which substrates carrying, adherently on its inner surface, a transparent electrode of a required pattern, characterized in that at least a portion of said pattern of transparent electrode on each substrate is subjected to a treatment for allowing the orientation of those molecules of the liquid crystal located at the site of the electrode to be aligned substantially in a direction parallel to the planes of the substrates when no voltage is applied, and also that the remaining portions of said pattern of the electrodes and the inner surfaces of said substrates which are in contact with the liquid crystal are subjected to a treatment for causing the orientation of the molecules of the liquid crystal to lie in a direction normal to the plane of the substrate when no voltage is applied. This display device is noted to be clear when viewed at the front side of the device during an application of a voltage across the electrodes, and thus it can make a display of a colored image due to the absorption of light by the dichroic dye as the voltage is removed.

Figure 1:
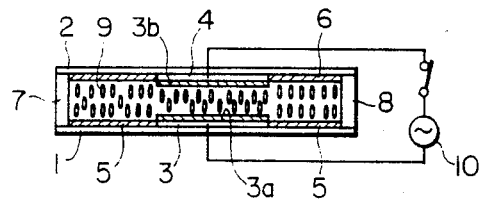
FIG. 1 is a diagrammatic vertical sectional view of an embodiment of the display device according to the present invention, showing a state of orientation when a voltage is applied to the device.

Referring here to FIG. 1, a display device comprises parallel transparent glass substrates 1 and 2 which are arranged to face each other at a distance, the inner surfaces of which being substantially covered with transparent electrodes 3 and 4 each having a required pattern, excepting the end edge portions. The glass substrates 1 and 2 are provided with films 5 and 6 adherently formed respectively on their inner surfaces which are in contact with the liquid crystal. These films 5 and 6 are formed through a treatment for causing the orientation of the molecules of the liquid crystal in a direction perpendicular to the plane of the substrates when no voltage is applied. Spacers 7 and 8 are provided on the opposing ends of the substrates to form an enclosed cell. A liquid crystal 9 having a positive dielectric anisotropy is placed in the space defined by the substrates 1 and 2, and the spacers 7 and 8. The electrodes 3 and 4 are connected to a power supply 10 by means of lead wires. These electrodes 3 and 4 are provided with films 3a and 3b formed respectively on those surfaces facing the liquid crystal. These films 3a and 3b are formed by a treatment for causing the orientation of the liquid crystal molecules in a direction parallel to the planes of the substrates.

Figure 2:
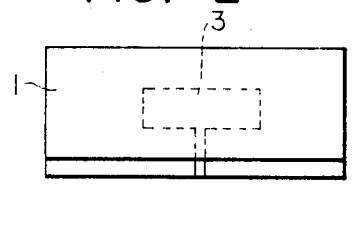
FIG. 2 is a plan view of the embodiment shown in FIG. 1.

Referring to FIG. 2 which shows a plan view of the cell of FIG. 1, the contour of the electrode 3 is depicted by dotted lines.

Figure 3A:
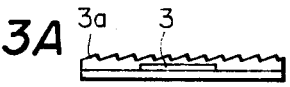
FIGS. 3A to 3E show successive stages of a process for forming molecule-orienting films on a substrate for causing desired specific orientations of the molecules of the liquid crystal according to the present invention.
Figure 3B:
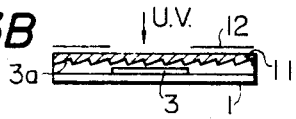
Figure 3C:
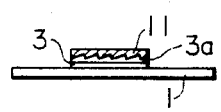
Figure 3D:
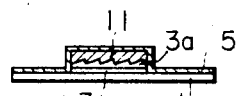
Figure 3E:
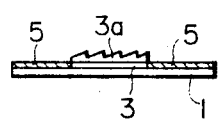

Referring to FIGS. 3A to 3E, there are shown a series of successive stages of the process for forming the aforementioned films for causing the perpendicular and parallel orientations of the liquid crystal molecules relative to the planes of the substrates. In the first stage, the surface of the transparent electrode 3 and that of the glass substrate 1 which is to be in contact with the liquid crystal are subjected to an oblique deposition thereon of a silicon oxide to form a film 3a which is intended to cause a parallel orientation of the molecules as shown in FIG. 3A. Then, a photoresist 11 is applied onto the top surface of film 3a and only the region of the photoresist just above the electrode 3 is exposed to light. This exposure to light can be carried out by covering, with masks 12, the entire region of the photoresist excepting the region located just above the electrode 3 as shown in FIG. 3B. Thereafter, the masked portions of films 3a and 11 are etched away so as to leave only those portions of the films located just above the electrode 3 as shown in FIG. 3C. Then, a film 5 which is made, for example, with lecithin which is intended to cause the perpendicular orientation of the molecules relative to the plane of the substrate is applied onto the surface so as to cover the residual photoresist film 11 and the now-light-exposed surface areas of the substrate as shown in FIG. 3D. Then, that portion of the film 5 covering the residual photoresist film 11 as well as this photoresist film 11 are both removed. FIG. 3E shows a cell component consisting of a glass substrate 1, an electrode 3 having a pattern and formed thereon, a film 5 provided on the substrate 1 and intended to cause the perpendicular orientation of the liquid cyrstal molecules located on said substrate 1, and a film 3a assigned for causing the parallel orientation of the molecules located on said electrode 3, is produced according to the process described above. Thus, the film intended for the perpendicular orientation of the molecules is formed only on that surface of the electrode 3 where the pattern is provided, while the film assigned for the parallel orientation is formed on the entire surface of that portion of the substrate located other than the region covered by the electrode.

Although the present invention has been described with respect to one of the components, i.e. regarding the substrate 1. It should be understood that the same steps of process may be applied to the other glass substrate 2. Compounds useful for forming the films for the perpendicular and parallel orientations of the liquid crystal molecules are well known by those skilled in the art, and their description is omitted.

The display device of the present invention which is fabricated in a manner as shown in FIG. 1 operates as explained below.

When no voltage is applied across the electrodes, the molecules of the liquid crystal disposed between the films 5 and 6 formed on the substrates 1 and 2, respectively, and assigned for causing the perpendicular orientation of these molecules are arranged in a direction perpendicular to the planes of the parallel substrates, while the molecules disposed between the films 3a and 3b formed on the patterns of electrodes 3 and 4, respectively, and assigned for causing the parallel orientation of the molecules are arranged in a direction parallel to the planes of the substrates. Therefore, the front surface of the device of FIG. 2, in the region of the pattern of electrode, is noted to be colored when viewed externally due to the light absorption effect of the dichroic dye, and to be colorless in the region located outside the pattern of the electrode due to the absence of such light absorption effect. Thus, the display device can effect a positive display, i.e. a display of a colored image corresponding to the pattern of electrode, on the colorless background.

When, on the other hand, a voltage is applied across the electrodes, the molecules of the liquid crystal are re-arranged so as to orient their longitudinal axes in a direction parallel to the direction of the applied electric field, i.e., in a direction perpendicular to the plane of the substrate. As a result, the light absorption effect of the dichroic dye at the site corresponding to the region of the pattern on electrode will disappear, so that the entire front surface of the display device is noted to be uniformly colorless when viewed.

In this way, the liquid crystal display device according to the present invention can effect a display of a embodiment colored image against a colorless background by removing an electric field across the electrodes, and can extinguish the image upon application of a voltage thereacross.

Figure 4A:
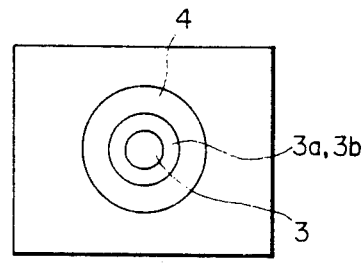
FIG. 4A is a plan view of another embodiment of the display device according to the present invention, showing contours of electrodes and molecule-orienting films formed on the substrates.
Figure 4B:
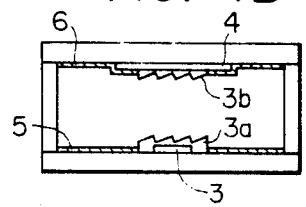
FIG. 4B is a diagrammatic vertical sectional view of the embodiment shown in FIG. 4A.
Figure 4C:
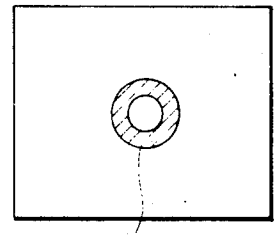
FIG. 4C shows an example of the shape of an image to be displayed by the cell structure shown in FIGS. 4A and 4B.

Although description has been made with respect to an of embodiment the liquid crystal display device according to the present invention in which the patterns of the electrodes 3 and 4 and those of the films 3a and 3b for the parallel orientation of molecules of crystal liquid have an identical configuration, it should be understood that said electrodes 3 and 4 need not be identical in their configurations. For example, in another preferred embodiment of the display device of the present invention shown in FIGS. 4A and 4B, electrodes 3 and 4 are of different sizes relative to each other. Oblique deposits, i.e., films 3a and 3b for causing a parallel orientation are of an identical configuration. A film 5 for the perpendicular orientation is formed on that part of the inner surface of the substrate located other than the region covered with the film 3a. A film 6 for the perpendicular orientation of molecules is formed so as to cover those portions of the surfaces of the substrate and of the electrode 4 located other than the region covered with the film 3b as shown in FIG. 4B. In the absence of a voltage, the molecules of the liquid crystal disposed between films 3a and 3b are oriented in a direction parallel to the plane of the substrate, so that a colored image of a round shape as that of the films 3a and 3b is visualized. Upon application of a voltage, however, those molecules of the liquid crystal located between the electrode 3 and a portion of the electrode 4 which is located opposite to the electrode 3 and is of the same round shape as the latter are oriented in a direction perpendicular to the plane of the substrate. Therefore, the central round portion of said colored round image corresponding to the region of the electrode 3 is turned colorless, resulting in the indication of a ring-shaped image as shown in FIG. 4C. In this way, the pattern of image may be remarkably increased in its variation freely by varying the pattern of the electrode and that of the film formed on the electrode and intended for the parallel orientation of molecules, as compared with the conventional display device. Moreover, that portion of the electrode which serves as a lead wire portion can be treated easily.

It will be apparent from the foregoing description that, according to the present invention at least a portion of the pattern of the electrode formed adherently on a glass substrate is treated to provide the ability of causing parallel orientation of liquid crystal molecules, and that those portions of the surface located at sites other than said portion which otherwise are directly in contact with the liquid crystal are treated for causing perpendicular orientation of molecules. Thus, the molecules of the liquid crystal having a positive dielectric anisotropy located at least on said portion are arranged in a direction parallel to the plane of the substrate, and those located on the region other than said portion are oriented perpendicular to said plane when no voltage is applied across the electrodes. The display device according to the present invention, thus, is able to effect a positive colored display when no voltage is applied, and therefore it is able to give a much sharper display as compared with the conventional liquid crystal display device.

Especially, the present invention employs a liquid crystal having a positive dielectric anisotropy to serve as host material, and therefore a voltage for causing a transition of the orientation of the liquid crystal molecules may be lower, and thus such difficulties encountered in the prior art as a low speed of response and early degradation of quality can be avoided.

Moreover, as the display device of the present invention can exhibit a colored pattern on a colorless screen, it can be used very effectively in apparatuses such as watches, speedmeters and level-indicators of vehicles which must effect a display of figures and in those which are to exhibit some patterns. Recently, it is required that indicators provided on automobiles can operate to make a clear display even when a power supply is cut off by accident. The display device of the present invention most suitably meets such demands.

What is claimed is:

1. A liquid crystal device including:
    a mixture of a liquid crystal, having a positive dielectric anisotropy as a host material, and a dichroic dye as a guest material, said mixture being disposed between a pair of glass substrates in an enclosed cell;
    each of said substrates having a transparent electrode of a required pattern adherently formed on its inner surface, at least a portion of said pattern of the transparent electrode on each substrate having a parallel-orientation film for causing
        orientation of molecules of the liquid crystal in a direction parallel to the plane of the substrate in the absence of a voltage applied and the remaining portions of said pattern and also the inner surface of said substrate to be in contact with the liquid crystal having a perpendicular-orientation film for causing orientation of the molecules of the liquid crystal in a direction perpendicular to the plane of the substrate in the absence of a voltage applied,
    wherein said parallel-orientation film does not overlap said perpendicular-orientation film, said parallel-orientation film on one substrate has substantially the same area as that of the film on the other substrate, and said portion covered with said parallel-orientation film of the electrode pattern on one substrate has a size different from that on the other substrate so that there exists, on one electrode pattern, at least a portion of said parallel-orientation film which is not sandwiched between the opposing electrodes and does not overlap any portion of said perpendicular-orientation film.

* * * * *